Figure 1:
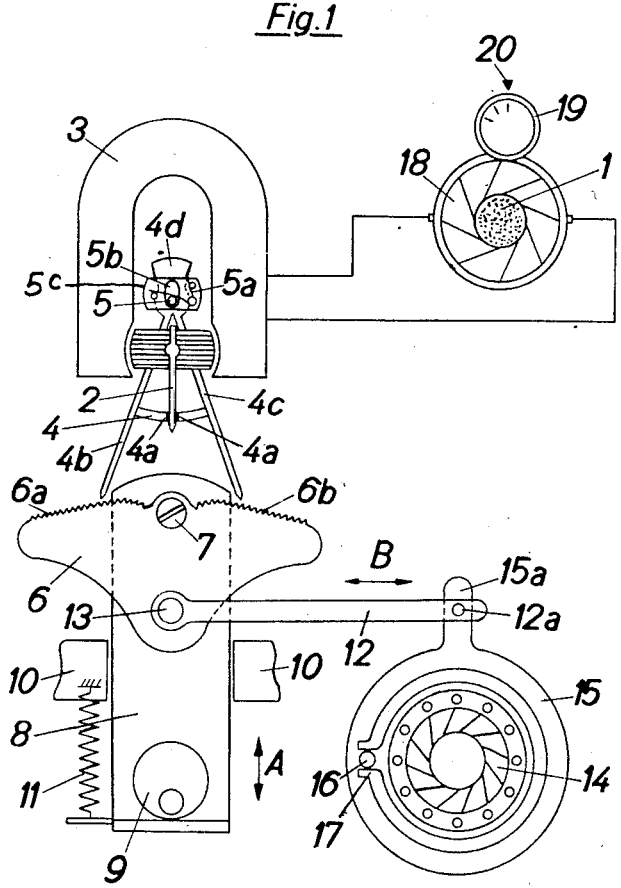

United States Patent Office 2,838,985
Patented June 17, 1958

2,838,985

AUTOMATIC EXPOSURE REGULATOR FOR PHOTOGRAPHIC APPARATUS

Michael Burger and Erich Burger, Munich, Germany

Application August 4, 1953, Serial No. 372,243

Claims priority, application Germany August 11, 1952

2 Claims. (Cl. 95—64)

This invention relates to photographic apparatus and particularly to mechanisms for automatically controlling exposure in accordance with ambient illumination. More specifically, the invention relates to an exposure control mechanism connected to be directly responsive to conventional galvanometer type, light-sensitive indicators.

Various attempts have been made previously to construct automatic control mechanism to coordinate the shutter operation with the instantaneous ambient illumination. In some instances these mechanisms have taken the form of devices to control the time of shutter actuation. In other instances such devices have taken a form which controls the opening in the lens diaphragm. All of these arrangements, however, have proven ineffective in practice due to the fact that such structures require the galvanometer indicator or pointer to perform substantial mechanical work, as for example, as a variable position stop for a moving feeler lever released by the shutter mechanism. One particular inefficacy in such structural arrangements is the necessity of employing an auxiliary means for holding the fragile indicator of the galvanometer in a fixed or stationary condition during the initial instant of shutter release. Other unsuccessful prior art constructions have employed electro-magnetic transmission devices which interposed substantial frictional forces of variable magnitude rendering operation spasmodic and doubtful.

It is therefore a primary object of the present invention to overcome these manifest inefficacies in prior art exposure regulators. It is a further object of the instant invention to provide an exposure regulator mechanism which automatically operates to vary the opening of the lens diaphragm in accordance with instant ambient illumination. Another object of the instant invention is to provide such type control mechanism in an exceedingly simplified structural arrangement. These and other objects will become apparent from the description and claims which follow.

Broadly, the present invention comprises a light-sensitive exposure regulator for cameras, motion picture cameras, or enlarging apparatus in which the diaphragm or the time of shutter operation may be automatically preconditioned by means of a scanning device in accordance with the ambient illumination. Preferably, the scanning element (or manual control device) is advantageously intermittently guided to cooperate with a galvanometer pointer by means of auxiliary power mechanism. The present invention is particularly efficacious in motion picture cameras where the auxiliary power for regulation of the diaphragm, or of the numbers of rotations of the rotary shutter, can be easily derived from the conventional driving mechanism in such type cameras.

One particular advantage of the present invention is the arrangement of the structure and operating characteristics contrary to prior art structures wherein the galvanometer pointer is necessarily tightly wedged in a fixed or stationary position, and only subsequently is the particular instantaneous indication of ambient illumination transferred mechanically to the exposure control means. It will further be apparent that such arrangement is readily susceptible to damage to the fragile galvanometer device. The present invention, on the other hand, mechanically transfers the position of the galvanometer pointer as a control function to the diaphragm or exposure time mechanism substantially instantaneous with the actuation of such mechanism whereby erroneous readings as well as damage to the galvanometer is obviated. A further advantage of the present invention resides in the positioning of the touching element in correlation with the exposure regulator mechanism in such manner that the former may easily comprise or be connected with a shutter release mechanism of conventional candid cameras.

A further advantage of the present invention resides in an arrangement whereby the galvanometer pointer remains unobstructed for freely swinging in accordance with ambient illumination except during the extremely brief interval in which the touching element is actuated to operate the shutter mechanism. One form of the invention preferably comprises a scissors-like organ having two blades lying in the swing zone of the galvanometer pointer in such manner that the position of the pointer is transmitted to the scissors-like organ, which upon being actuated in the manner of a scissors, is sooner or later restrained from further movement by the interposed pointer. In such arrangement the scissors-like organ is connected to adjust the lens diaphragm correspondiing to the arresting position of the galvanometer pointer. In a preferred form of the invention, the scissors-like organ consists of opposed, pivoted, double-armed blades having teeth on either side of the pivotal axis and adapted to contact on the respective sides of one or the other pointer arms of a double pointer device operated by the galvanometer. With this arrangement the respective swinging blades of the scissors-like organ accommodate an adjustment of the lens diaphragm in both directions of swing automatically.

In another form, the invention may comprise a pivoted double-armed lever having ratchet teeth and being pivotally mounted upon an oscillating member. The pusher member serves to move the lever to contact the galvanometer pointer, or not, upon operation of a touching element. In this form of the invention actuation of the touching element to contact the double-armed lever with the galvanometer pointer permits a predetermined rotation of the lever dependent upon the position of the pointer, which rotation may be transmitted to the lens diaphragm of the camera. This arrangement is particularly suitable for motion picture cameras in which the conventional driving mechanism may be readily adapted to intermittent contact of said arm lever with said galvanometer pointer. Also, it will be recognized that the exposure regulation arrangement may be connected to control the lens diaphragm or the exposure time in photographic cameras, or the number of rotations of a rotary shutter as in motion picture cameras. It will be obvious that in the case of photographic cameras, adjustment of the touching element may be provided by the shutter driving mechanism.

Figure 2:
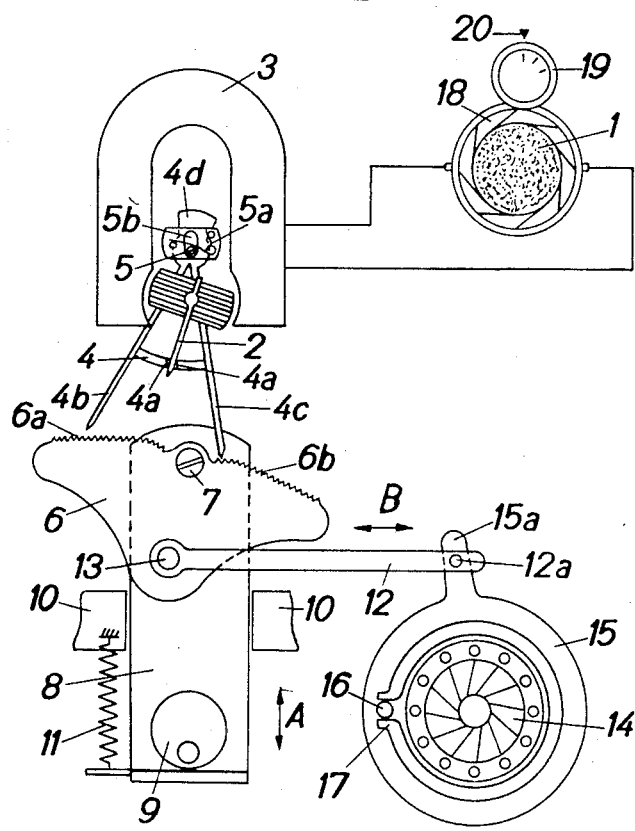
Figure 3:
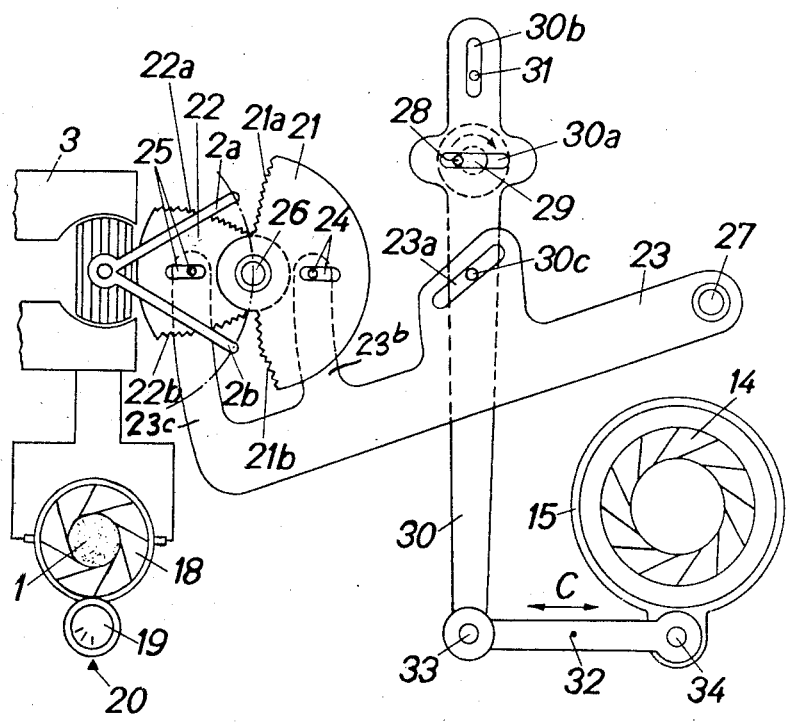
Figure 4:
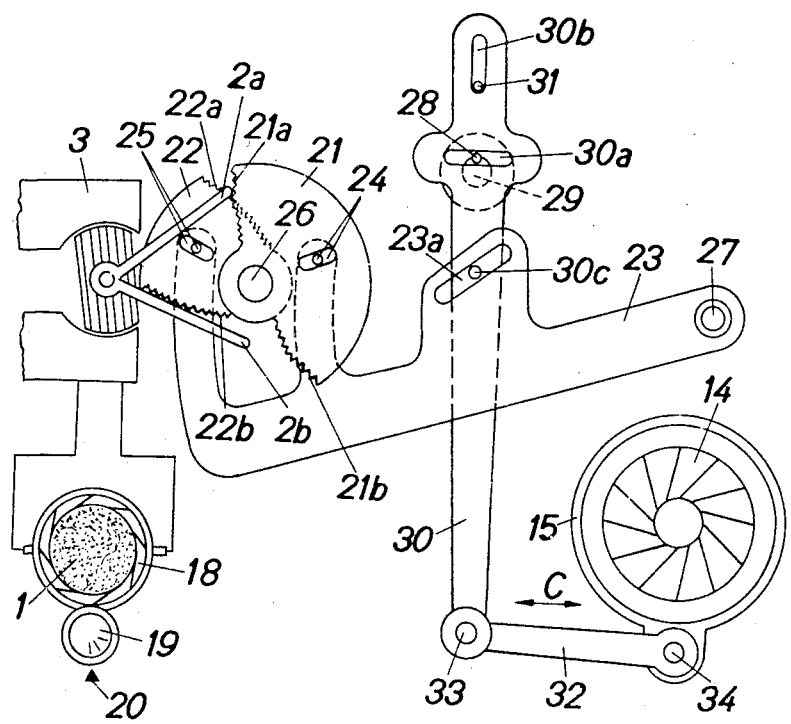

Having generally described the invention, reference will now be made to the accompanying drawings in explaining several specific examples of the same, and in which:

Fig. 1 is a schematic view illustrating an exposure regulator mechanism according to one form of the invention, Fig. 2 is a schematic view of the form of the invention shown in Fig. 1 illustrating the same with the galvanometer mechanism responsive to ambient illumination, Fig. 3 is a schematic view of another form of the invention employing a scissors-like control organ, and Fig. 4 is a schematic view of a form of the invention illustrated in Fig. 3 showing the same when the galvanometer is responsive to ambient illumination.

As shown in Figs. 1 and 2, the invention comprises a lens diaphragm control mechanism, 6 through 11, inclusive, connected to operate a lens diaphragm, 14 through 17 inclusive, in response to a galvanometer unit, 2 through 5 inclusive, connected for actuation by a light-sensitive photo element 1. In accordance with conventional practice, ambient illumination received by photo element 1 generates a control current which is sent to the galvanometer 3 to cause a deviation of the needle or pointer 2 in a well-known manner. According to the present invention, the diaphragm position of pointer 2 is connected or relayed to the lens diaphragm mechanism 15 to control the same via an interposed connecting unit, 6 through 10 inclusive.

This unit comprises a double-armed lever 6 having ratchet teeth 6a and 6b on the respective arms, the lever being pivoted as by means of a screw 7 on a reciprocable slide block or oscillating pusher element 8. The pusher 8 is adapted to reciprocate in guide ways 10 under the effect of compression spring 11 and an eccentric touching element 9. The arrangement is such that spring 11 normally tends to retract pusher 8 towards the pointer 2 of the galvanometer while the eccentric element 9 opposes the action of the spring depending upon its rotated position.

Lever 6 carries a pivot pin 13 mounting a link or strut 12 which in turn is connected with a projecting arm 15a on a lens diaphragm adjusting ring 15 by means of a pin 12a. In order to permit rapid exchange of diaphragm units, the adjusting ring 15 is connected with the conventional inner diaphragm ring by means of a tongue and yoke connection 16, 17. This arrangement facilitates the ready interchange of different sized diaphragms without requiring adjustment in the exposure regulating unit.

In order to protect the extremely fragile and sensitive pointer of the galvanometer unit, the pointer is arranged to resiliently drive a directing double-armed indicator 4. The directing indicator 4, for this purpose, includes a pair of upturned flanges 4a projecting from the respective arms 4b and 4c towards the pointer 2. Directing indicator 4 is rotatably mounted by means of an axle 5 projecting into a slot 5b on a stationary plate 5c and is normally urged to the lower portion of said slot under the effect of a spring 5a, but being permitted to retract upwardly in said slot against the action of said spring. It will be appreciated that this arrangement serves to accommodate engagement of the lever 6 with the indicator arms to simultaneously readjust the position of indicator arms 4b and 4c with pointer 2 in relationship with the instant ambient illumination. In the present form of the invention, the direction indicator 4 also is provided with an enlarged free rear end 4d which serves as a counter-balance for the indicator arms 4b and 4c. It will be readily appreciated that pivoted movement of the indicator arms 4b and 4c on axle 5 is transmitted directly by pointer 2 through the upturned flanges 4a in either direction of rotation of the pointer.

In some instances it may be desirable to provide a lost motion or play between the pointer 2 and the flanges 4a. Alternatively, it may be desirable to construct flanges 4a as elastic members providing a resilient take-up or follow-up action between pointer 2 and the arms 4b, 4c. In any case the double-armed indicator functions to protect the fragile bearing structure of the galvanometer needle 2.

The operation of the device may be briefly described as follows. Energization of the photo sensitive unit 1 by ambient illumination causes galvanometer 3 to deflect pointer 2 in either a counterclockwise or clockwise direction and to therewith rotate the pointer 4, as for example, to the position shown in Fig. 2 of the drawings. When the pusher 8 moves lever 6 towards the indicator 4, the lever 6 will rotate in clockwise direction about pivotal axis 7 as soon as lever 6 with its ratchet teeth 6b is brought in contact with pointer arm 4c. The clockwise rotation of lever 6 causes diaphragm control ring 15 to be rotated in a counter-clockwise direction by means of link 12 and to open the lens diaphragm wider. Rotation of lever 6 and diaphragm control ring 15 will be stopped, when the oscillating member 8 reaches its extreme position, being predetermined by the eccentric element 9 (shown in Fig. 2).

Thereafter, when eccentric element 9 causes lever 6 to be withdrawn from contact with double-arm pointer 4 under the action of spring 11, the lens diaphragm 14 remains in its pre-adjusted position by reason of friction of the parts forming said lens diaphragm. It remains in this position, too, during the following scanning acts of lever 6, when the ambient illumination will be constant, and changes its position when ambient illumination varies, without returning into a "start" position in the time between two following scanning acts.

So it will be appreciated that this device instantaneously transmits a control function corresponding to ambient illumination to adjust the lens diaphragm in a predetermined relationship therewith.

When the present invention is realized in motion picture cameras, the auxiliary power for constant rotation of eccentric element 9 may be derived from the conventional film driving mechanism.

When the present invention is applied to candid cameras the eccentric element 9 may be preferably operated for a single rotation by the shutter release system.

One of the advantages of the latter arrangement is the inherent flexibility provided whereby the movement of member 8 may be coordinated with the shutter to obtain the desired exposure correction factor and yet permit withdrawal of the load from the galvanometer pointer before the shutter actually releases. It will be recognized that elimination of constant contact between lever 6 and indicator arms 4b, 4c provides a great reduction in the wear on the delicate pointer bearings.

The present invention contemplates a further improvement which is adapted to compensate for different sensitivities in the film material used by providing a preadjustable shield to control the photo sensitive unit 1, dependent upon the type film desired to be exposed. This feature of the invention is readily accommodated by providing an adjustable diaphragm 18 in front of the photo sensitive cell 1, the diaphragm being preadjusted by a control dial 19 cooperating with an indicator mark 20. The operation of this control will be readily appreciated from the comparison of Figs. 1 and 2 respectively, depicting the condition of diaphragm 18 when adjusted for a relatively non-sensitive film (see Fig. 1) in which case the diaphragm screens the photo cell, and when adjusted for a highly sensitive film (see Fig. 2) in which case diaphragm 18 provides full opening for the photo cell.

A modified form of the invention is illustrated in Figs. 3 and 4 of the drawings, in which like numerical subscripts denote like components. In this form of the invention it is possible to dispense with the intermediate coupling structure between the galvanometer pointer and the exposure regulator unit. For this purpose the galvanometer pointer is formed to have angularly related arms, 2a, and 2b, and is adapted to cooperate with a scissors-like organ comprising a pair of opposed pivoted blades 21 and 22, connected for oscillation about a fixed pivotal axis 26, the blades being respectively provided with ratchet teeth 21a, 21b and 22a, 22b. It will be appreciated that the opposed blades 21 and 22 constitute an equivalent mechanism to the single pivoted lever or blade 6 of the Fig. 1 embodiment.

Blades 21 and 22 function as a double swing in which the opposed arms 21a and 22a, or 21b and 22b, oscillate towards and away from each other to clamp the respective interposed arms 2a and 2b of the galvanometer pointer therebetween. For this purpose, the pointer arms may include down-turned ends projecting between the respective blades of the double swing.

Oscillation of blades 21 and 22 about the pivotal axis 26 is obtained in the present embodiment by means of a pivoted lever 23 supported to oscillate about a pivot pin 27. Each arm bears a pin projecting into a slot in the respective blade members of the double swing to provide a lost motion, pin and slot connection, 24 and 25, respectively, between the blades and the lever 23.

Oscillation of lever 23 is obtained by means of a second control lever 30 connected by means of an integral pivot pin 33 with a link 32 which in turn is connected to the lens diaphragm adjusting ring 15 by a pin 34. Lever 30 is mounted to be movable in the direction of the arrow C by reason of a longitudinal slot 30b, supported and guided over a fixed guide peg 31. Lever 30 further includes a transverse slot 30a which is adapted to cooperate with a rotating disc member 29 having an eccentrically located peg 28 projecting into slot 30a. By reason of this arrangement, rotation of the member 29 in the direction of the arrow will cause oscillation of lever 30 along its longitudinal axis due to the pin and slot supporting connection 30b, 31.

Lever 30 also is interconnected with lever 23 by means of an integral peg 30c (carried by the lever) which projects through an oblique slot 23c in the center lever 23. With this arrangement it will be readily appreciated that longitudinal movement of lever 30 under the effect of eccentric disc 29 can be converted into a limited transverse movement by reason of the guiding action of pin 30c in slot 23c.

This embodiment of the invention functions in a manner substantially analogous to that of Fig. 1. The galvanometer pointer 2a, 2b is permitted to move freely until such time as the scanning device or other control mechanism, which is connected with the disc 29, is actuated. When such condition occurs, longitudinal movement of lever 30 will be transmitted by pin connection 30c, 23c to lever 23 and cause blades 21 and 22 to pivot about axis 26 under the effect of the pin and slot connection 24 and 25. At such time the pivoted blades 21 and 22 will serve to pinch or clamp the down-turned end of one of the pointer arms between such blades, as for example, as illustrated in Fig. 4 of the drawing. When this occurs, further movement of lever 23 under the action of peg 30c is arrested and lever 30 is thereby caused to translate laterally in one of the directions of the arrow C upon continued rotation of eccentric disc member 29. This lateral translation of lever 30 is relayed to the adjusting ring 15 via the connection link 32 to adjust the lens diaphragm from the condition illustrated in Fig. 3 to that shown in Fig. 4. It will thus be appreciated that since movement of control disc 29 is integrally related with the shutter release mechanism in any of many well-known ways, the adjustment of the lens diaphragm may take place substantially simultaneously with the snapping of the picture to thereby provide a highly accurate and coordinated exposure regulation.

A limiting condition in the present embodiment resides in the fact that the frictional resistance of the diaphragm adjusting mechanism 14, 15 should be maintained greater than the frictional resistance in the linkage connections to the scissor-like organ 21, 22 in order that during the position of rest of the galvanometer pivot arms 2a, 2b (see Fig. 3), the blades of the double swing may oscillate freely about axis 26 without displacing the diaphragm. This condition is readily accommodated, however, by conventional camera structures.

A feature of this embodiment resides in the provision of means for simultaneously clamping and holding the galvanometer pointer in an arrested position while instantaneously relaying a control function corresponding to the incident ambient illumination. It will be recognized by those skilled in the art that the present structure obviates substantially all of the auxiliary elements required in prior art arrangements. Another feature of the present invention is the elimination of all stresses on the bearings of the galvanometer pointer. This results from the fact that the braking action of blades 21 and 22 takes place in a plane which is perpendicular to the plane of the bearings. It will be appreciated that if desired the oscillating lever 23 may be eliminated and the double swing blades connected to be actuated from a pusher member such as a reciprocating member 8 in the Fig. 1 construction.

As many apparently widely different embodiments of this invention may be made without departing from the spirit and scope thereof, it is to be understood that the above invention is not limited, except as defined in the appended claims.

What is claimed is:

1. An automatic exposure regulator for photographic apparatus, preferably for motion picture cameras, having means for controlling the exposure of the film, comprising a galvanometer including a bifurcated pointer structure with downturned terminal ends, said pointer being deflected in accordance with the degree of incident light, a scissors-like organ positioned adjacent to said pointer structure and including opposed blades straddling the respective terminal ends of said bifurcated lever whereby rotation of said blades serves to clamp one or the other of said terminal ends therebetween, a second pivoted control lever, link means connecting said second lever with said film exposure control structure, and a third pivoted lever connected to operate the respective blades of said scissors-like organ, and means interconnecting said second and third levers for controlling the movement of said second lever in accordance with the clamping action of said blades on one or the other arm of said bifurcated indicator.

2. An automatic exposure regulator for photographic apparatus, preferably for motion picture cameras, having means for controlling the exposure of the film, comprising an electrically operated light measuring system including a deflection pointer for indicating the strength of available light, two scissors-like organs bearing ratchet teeth for clamping said pointer, two levers, a rotatable means engaging one of said levers with each of said scissors-like organs, an oscillating member driven by an auxiliary force, means connecting said two levers to said oscillating member whereby movement of said member causes said levers to move in opposite directions thereby causing said scissors-like organs to clamp the structure of said deflection pointer between them, and said oscillating member is operatively engaged with said control means to relay the relative value of available light to said control means when the movement of said levers is arrested responsive to the position of said pointer.

References Cited in the file of this patent
UNITED STATES PATENTS 2,058,531   Tuttle _____ Oct. 27, 1936

FOREIGN PATENTS 842,887   Germany _____ Nov. 20, 1952